United States Patent
Marcin et al.

(10) Patent No.: US 10,596,621 B1
(45) Date of Patent: Mar. 24, 2020

(54) METHOD OF MAKING COMPLEX INTERNAL PASSAGES IN TURBINE AIRFOILS

(71) Applicant: United Technologies Corporation, Farmington, CT (US)

(72) Inventors: John Joseph Marcin, Marlborough, CT (US); Mario P. Bochiechio, Vernon, CT (US)

(73) Assignee: United Technologies Corporation, Farmington, CT (US)

(*) Notice: Subject to any disclaimer, the term of this patent is extended or adjusted under 35 U.S.C. 154(b) by 130 days.

(21) Appl. No.: 15/694,410

(22) Filed: Sep. 1, 2017

Related U.S. Application Data (63) Continuation-in-part of application No. 15/473,403, filed on Mar. 29, 2017.

(51) Int. Cl.
| | |
|---|---|
| *B22C 9/10* | (2006.01) |
| *B22C 9/04* | (2006.01) |
| *B22C 9/12* | (2006.01) |
| *B22D 29/00* | (2006.01) |
| *B22D 25/02* | (2006.01) |

(Continued)

(52) U.S. Cl.
CPC ............... *B22C 9/103* (2013.01); *B22C 9/04* (2013.01); *B22C 9/108* (2013.01); *B22C 9/12* (2013.01); *B22D 25/02* (2013.01); *B22D 29/002* (2013.01); *B22F 3/10* (2013.01); *B22F 3/24* (2013.01); *B22F 7/02* (2013.01); *B28B 1/16* (2013.01); *B28B 11/243* (2013.01); *B22F 2301/20* (2013.01)

(58) Field of Classification Search
CPC .... B22C 3/00; B22C 7/00; B22C 7/02; B22C 9/04; B22C 9/10; B22C 9/12; B22C 9/24; B22D 25/02; B22D 29/00
USPC ........................ 164/23, 28, 30, 516, 45, 369
See application file for complete search history.

(56) References Cited

U.S. PATENT DOCUMENTS

| | | |
|---|---|---|
| 5,824,250 A | 10/1998 | Whalen et al. |
| 6,443,213 B1 | 9/2002 | Graham et al. |

(Continued)

FOREIGN PATENT DOCUMENTS

| | | |
|---|---|---|
| EP | 1153681 A1 | 11/2001 |
| JP | 2004082206 A | 3/2004 |

(Continued)

OTHER PUBLICATIONS

Partial European Search Report for EP Applictaion No. 18164387.5, dated Jun. 25, 2018, 14 Pages.

(Continued)

*Primary Examiner* — Kevin P Kerns
(74) *Attorney, Agent, or Firm* — Kinney & Lange, P.A.

(57) ABSTRACT

A method of making a composite core includes forming first and second cores of refractory metal and ceramic material. Each of the first and second cores is formed with two layers of a material. The layers are bonded together to form a laminate master pattern, and a flexible mold is formed around the pattern. The pattern is removed from the flexible mold, and slurry material, either pulverulent refractory metal material or ceramic material, is poured into the flexible mold. The slurry material is sintered to form each core. The first core is used as an insert while making the second core to create a final composite core.

11 Claims, 8 Drawing Sheets

(51) Int. Cl.
*B22F 3/10* (2006.01)
*B22F 3/24* (2006.01)
*B22F 7/02* (2006.01)
*B28B 1/16* (2006.01)
*B28B 11/24* (2006.01)

(56) References Cited

U.S. PATENT DOCUMENTS

| | | |
|---|---|---|
| 6,637,500 B2 | 10/2003 | Shah et al. |
| 6,889,747 B2 | 5/2005 | Graham |
| 7,108,045 B2 | 9/2006 | Wiedemer et al. |
| 7,141,812 B2 | 11/2006 | Appleby et al. |
| 7,410,606 B2 | 8/2008 | Appleby et al. |
| 7,411,204 B2 | 8/2008 | Appleby et al. |
| 7,438,118 B2 | 10/2008 | Santeler |
| 7,448,428 B2 | 11/2008 | Graham et al. |
| 7,575,039 B2 | 8/2009 | Beals et al. |
| 7,624,787 B2 | 12/2009 | Lee et al. |
| 7,780,905 B2 | 8/2010 | Dodds |
| 7,861,766 B2 | 1/2011 | Bochiechio et al. |
| 7,905,273 B2 | 3/2011 | Dodds et al. |
| 7,913,743 B2 | 3/2011 | Bedzyk |
| 7,958,928 B2 | 6/2011 | Garlock et al. |
| 8,056,607 B2 | 11/2011 | Garlock et al. |
| 8,091,610 B2 | 1/2012 | Graham et al. |
| 8,196,640 B1 | 6/2012 | Paulus et al. |
| 8,317,475 B1 | 11/2012 | Downs |
| 8,678,771 B2 | 3/2014 | Merrill et al. |
| 9,038,700 B2 | 5/2015 | Dube et al. |
| 9,208,917 B2 | 12/2015 | Appleby et al. |
| 9,272,324 B2 | 3/2016 | Merrill et al. |
| 9,315,663 B2 | 4/2016 | Appleby et al. |
| 9,486,854 B2 | 11/2016 | Propheter-Hinckley |
| 2006/0086478 A1* | 4/2006 | Persky et al. ............. B22C 9/10 164/138 |
| 2007/0084581 A1 | 4/2007 | Graham et al. |
| 2009/0224441 A1 | 9/2009 | Dodds |
| 2011/0135263 A1 | 6/2011 | Molin et al. |
| 2013/0052415 A1* | 2/2013 | Burns et al. ............. B22F 3/22 428/141 |
| 2013/0139990 A1 | 6/2013 | Appleby et al. |
| 2013/0280093 A1 | 10/2013 | Zelesky et al. |
| 2013/0341822 A1 | 12/2013 | Ellgass et al. |
| 2016/0003056 A1 | 1/2016 | Xu |
| 2016/0151829 A1 | 6/2016 | Propheter-Hinckley et al. |
| 2016/0222790 A1 | 8/2016 | Spangler |
| 2017/0113265 A1 | 4/2017 | Slavens et al. |

FOREIGN PATENT DOCUMENTS

| | | |
|---|---|---|
| WO | 2009094012 A2 | 7/2009 |
| WO | 2011050025 A2 | 4/2011 |
| WO | 2011070557 A2 | 6/2011 |
| WO | 2011071974 A2 | 6/2011 |
| WO | WO2017160303 A1 | 9/2017 |

OTHER PUBLICATIONS

Extended European Search Report for EP Application No. 18163906.3, dated Jun. 25, 2018, pp. 13.

Extended European Search Report for EP Application No. 18164387.5, dated Oct. 9, 2018, pp. 11.

Michael Appleby et al., "Tomo-Lithographic-Molding (TLM(TM)—A Breakthrough Manufacturing Process for Large Area Micro-Mechanical Systems," Jan. 1, 2005, Retrieved: https://pdfs.semanticscholar.org/3c63/dde03a7277e855leffae017e6ee266855fb4.pdf.

Partial European Search Report for EP Application No. 18164387.5, dated Jun. 25, 2018, 14 Pages.

Communication Pursuant to Article 94(3) EPC for EP Application No. 18164387.5, dated Jun. 18, 2019, pp. 3.

* cited by examiner

METHOD OF MAKING COMPLEX INTERNAL PASSAGES IN TURBINE AIRFOILS

CROSS-REFERENCE TO RELATED APPLICATION(S)

This application is a continuation in part of U.S. application Ser. No. 15/473,403 filed Mar. 29, 2017 for "APPARATUS FOR AND METHOD OF MAKING MULTI-WALLED PASSAGES IN COMPONENTS" by J. Marcin, M. Zelesky, J. Wagner, T. Hall, D. Krause and B. Reinert.

BACKGROUND

The present disclosure relates to casting cores, and in particular to investment casting cores which are formed at least in part from refractory metals made by a TOMO-lithographic manufacturing process.

Investment casting is a commonly used technique for forming metallic components having complex geometries, especially hollow components, and is used in the fabrication of superalloy gas turbine engine components (i.e. components comprised of materials such as, for example, single-crystal PWA1480, single-crystal PWA1484, columnar grain PWA1422, columnar grain PWA1426, and other nickel-base alloys). Gas turbine engines are widely used in aircraft propulsion, electric power generation, and ship propulsion. In all gas turbine engine applications, efficiency is a prime objective.

Improved gas turbine engine efficiency can be obtained by operating at higher temperatures, however current operating temperatures are at such a level that, in the turbine section, the superalloy materials used have limited mechanical properties. Consequently, it is a general practice to provide air cooling for components in the hottest portions of gas turbine engines, typically in the turbine section. Cooling is provided by flowing relatively cool air from the compressor section of the engine through passages in the turbine components to be cooled. It will be appreciated that cooling comes with an associated cost in engine efficiency, consequently, there is a strong desire to provide enhanced specific cooling, maximizing the amount of cooling benefit obtained from a given amount of cooling air.

Figure 1:
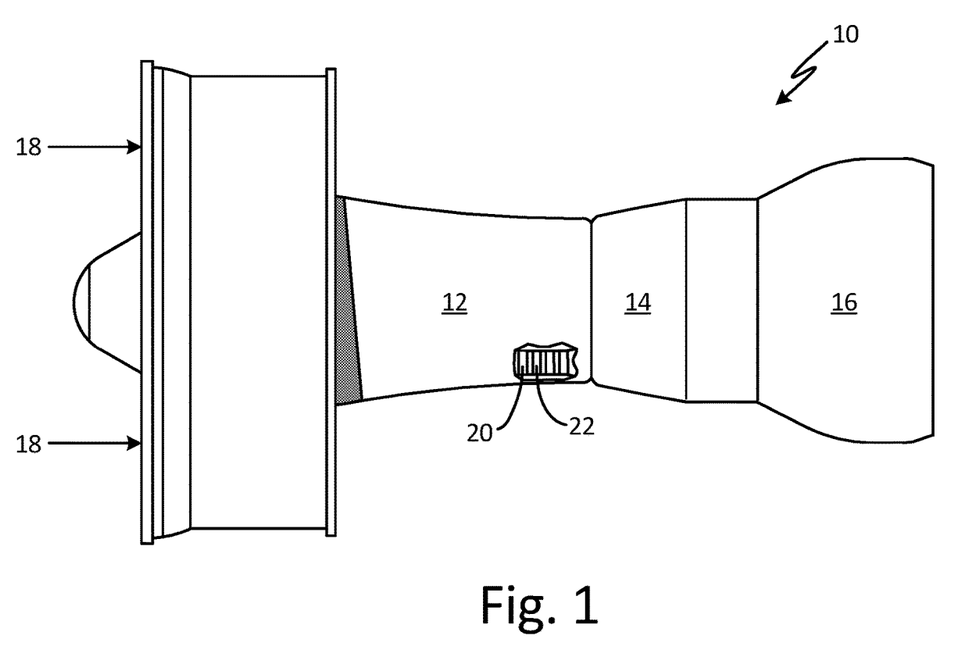
FIG. 1 is a simplified, broken away elevation view of a gas turbine engine.

Referring to FIG. 1, a gas turbine engine 10 includes a compressor 12, a combustor 14, and a turbine 16. Air 18 flows axially through the sections 12, 14, and 16 of the engine 10. As is well known in the art, air 18, compressed in the compressor 12, is mixed with fuel which is burned in the combustor 14 and expanded in the turbine 16, thereby rotating the turbine 16 and driving the compressor 12.

Both the compressor 12 and the turbine 16 are comprised of rotating and stationary airfoils 20, 22, respectively. The airfoils, especially those disposed in the turbine 16, are subjected to repetitive thermal cycling under widely ranging temperatures and pressures. To avoid thermal damage to the airfoils, each airfoil 20 includes internal cooling.

Figure 2:
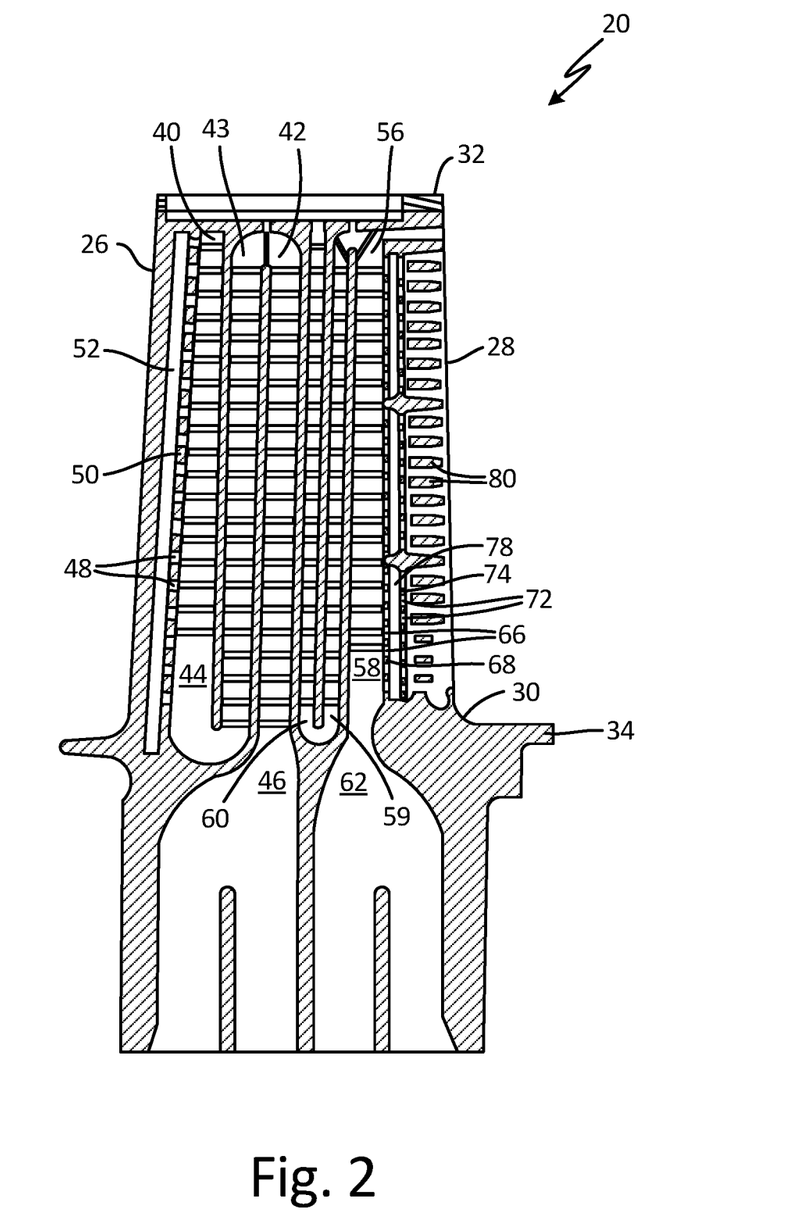
FIG. 2 is an enlarged, cross-sectional elevation view of an airfoil of the gas turbine engine of FIG. 1.

Referring to FIG. 2, the airfoil 20 includes a leading edge 26 and a trailing edge 28 extending from a root end 30 to a tip 32 thereof and a platform 34. A leading edge cooling passage 40 is formed within the leading edge 26 of the airfoil 20 having radially extending, connected channels 42-44 and a leading edge inlet 46, formed within the platform 34 and in fluid communication with the channel 42. A plurality of leading edge crossover holes 48 formed within a leading edge passage wall 50 separating the channel 44 from a leading edge exhaust passage 52, allow the cooling air from the channel 44 to flow into the leading edge exhaust passage 52. A trailing edge cooling passage 56 is formed within the trailing edge 28 of the airfoil 20 having radially extending connected channels 58-60 and a trailing edge inlet 62 formed within the platform 34 and in fluid communication with the channel 58. A first plurality of trailing edge crossover holes 66 is formed within a first trailing edge wall 68 and a second plurality of trailing edge crossover holes 72 is formed within a second trailing edge wall 74 to allow cooling air from channel 58 to flow through an intermediate passage 78 to a plurality of trailing edge slots 80.

Figure 3:
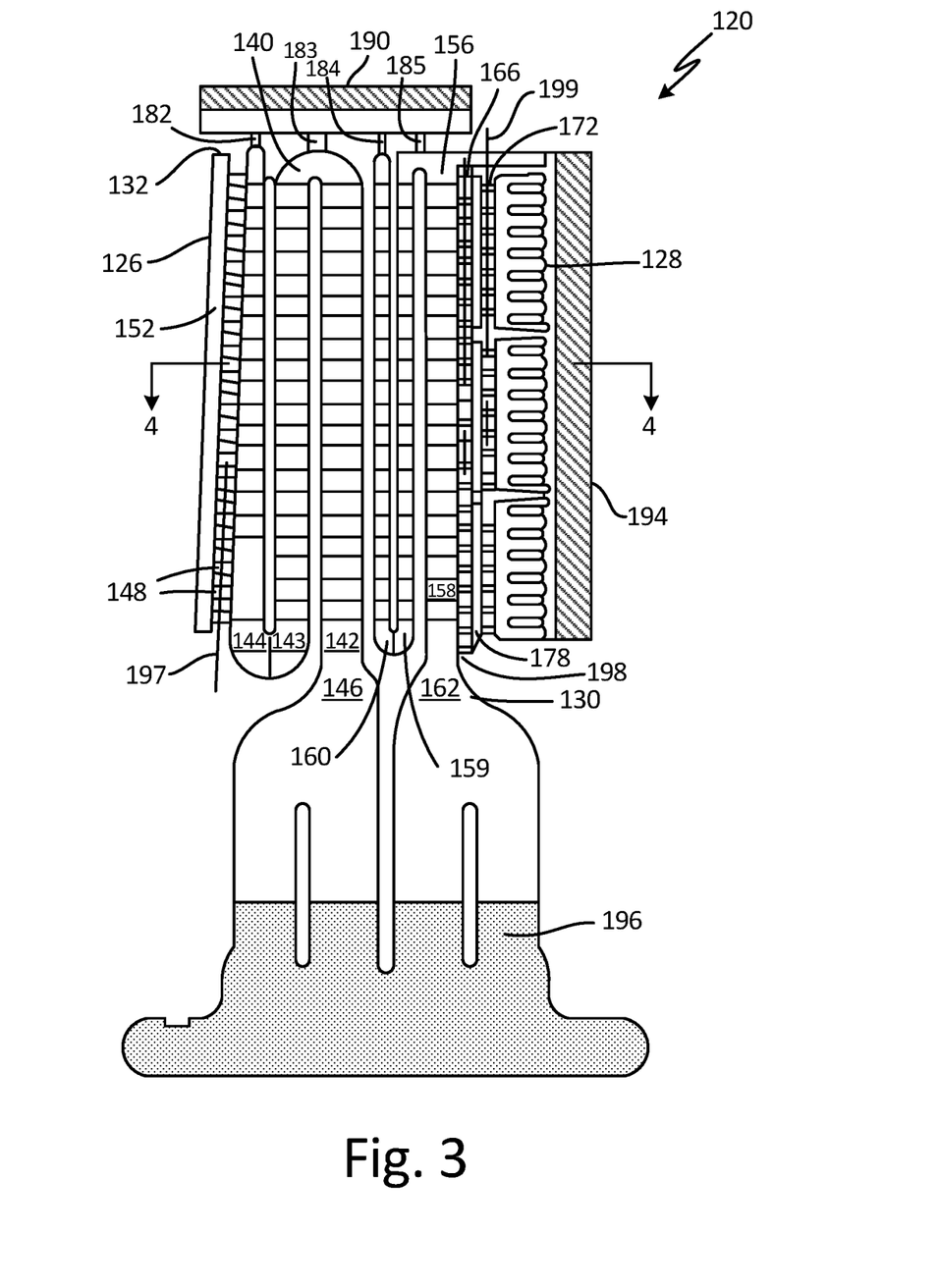
FIG. 3 is an elevation view of a ceramic core defining cooling passages for manufacturing of the airfoil of FIG. 2.
Figure 4:
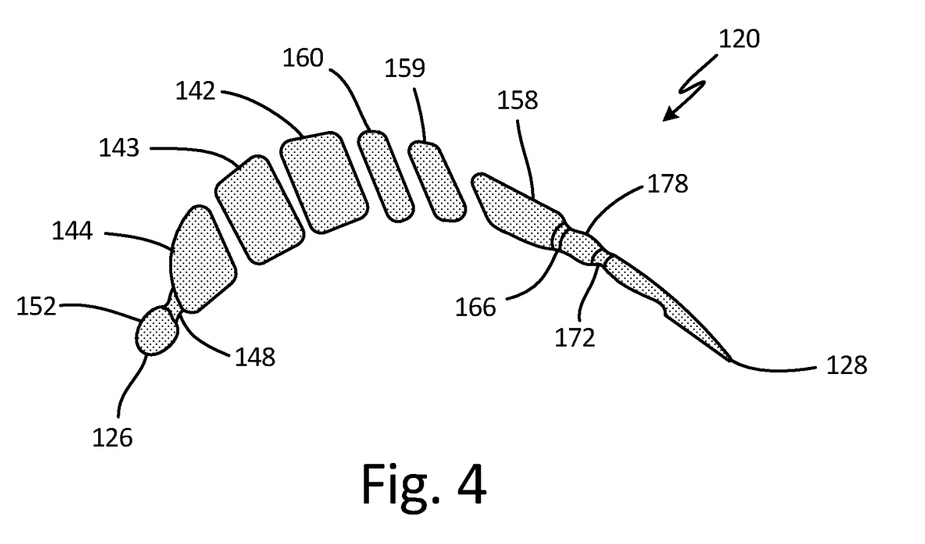
FIG. 4 is a cross-sectional elevation view of the ceramic core taken in the direction of section line 4-4 in FIG. 3.

A ceramic core 120, as depicted in FIGS. 3 and 4, is used in the manufacturing process of the airfoils 20 and defines the hollow cavities therein. A ceramic core leading edge 126 and a ceramic core trailing edge 128 correspond to the leading edge 26 and trailing edge 28 in the airfoil 20, respectively. A ceramic core root 130 and a tip 132 correspond to the airfoil root 30 and tip 32, respectively. Ceramic core passages 140, 156 with channels 142-144, 158-160, and inlets 146, 162 respectively, correspond to passages 40, 56 with channels 42-44, 58-60 and inlets 46, 62, of the airfoil, respectively. Passages 52 and 78 of the airfoil correspond to channels 152 and 178 in the ceramic core. Pluralities of fingers 148, 166, 172 in the core 120 correspond to the plurality of crossover holes 48, 66, 72 in the airfoil 20, respectively. A core tip 190 is attached to the core passages 140, 156 by means of fingers 182-185, to stabilize the core 120 at the tip 132. An external ceramic handle 194 is attached at the core trailing edge 128 for handling purposes. A core extension 196 defines a cooling passage at the root to the airfoil 20. Centerlines 197-199 extend radially through each row of fingers 148, 166, 172, respectively.

While turbine blades and vanes are some of the most important components that are cooled, other components such as combustion chambers and blade outer air seals also require cooling, and such components (and in fact all complex cast articles) can include similar structures to those shown in FIG. 2 and be made using ceramic cores with general similarities to those shown in FIGS. 3 and 4.

Conventionally, cores such as that shown in FIGS. 3 and 4 are fabricated entirely from ceramic materials. Such cores are fragile, especially the advanced cores used to fabricate small intricate cooling passages in advanced hardware. Conventional cores are prone to warpage and fracture during fabrication and during casting. In some advanced experimental blade designs casting yields of less than 10% are achieved, principally because of core failure.

Conventional ceramic cores are produced by a molding process using a ceramic slurry and a shaped die (not shown); both injection molding and transfer-molding techniques may be employed. The pattern material is most commonly wax although plastics, low melting-point metals, and organic compounds such as urea, have also been employed. The shell mold (not shown) is formed using a colloidal silica binder to bind together ceramic particles which may be alumina, silica, zirconia, and alumina silicates.

The investment casting process to produce a turbine blade, using a ceramic core, will be explained briefly here (although it is not depicted in any of the figures). A ceramic core having the geometry desired for the internal cooling passages is placed in a metal die whose walls surround but are generally spaced away from the core. The die is filled with a disposable pattern material such as wax. The die is removed leaving the ceramic core embedded in a wax pattern. The outer shell mold is then formed about the wax pattern by dipping the pattern in a ceramic slurry and then applying larger, dry ceramic particles to the slurry. This process is termed stuccoing. The stuccoed wax pattern, containing the core, is then dried and the stuccoing process repeated to provide the desired shell mold wall thickness. At this point the mold is thoroughly dried and heated to an elevated temperature to remove the wax material and strengthen the ceramic material.

The result is a ceramic mold containing a ceramic core which in combination define a mold cavity. It will be understood that the exterior of the core defines the passageway to be formed in the casting and the interior of the shell mold defines the external dimensions of the superalloy casting to be made. The core and shell may also define casting portions such as gates and risers which are necessary for the casting process but are not a part of the finished cast component.

After the removal of the wax and thermally sintering the refractory ceramic shell mold, molten superalloy material is poured into the cavity defined by the shell mold and core assembly and solidified. The mold and core are than removed from the superalloy casting by a combination of mechanical and chemical means.

SUMMARY

A method of making a composite core includes creating a first core insert comprising the steps of: forming a first layer of the first core insert out of a first material, forming a second layer of the first core insert out of the first material, bonding the first and second layers of the first core insert together to form a first laminate master pattern, forming a first flexible mold around the first laminate master pattern, removing the first laminate master pattern from the first flexible mold, pouring a first slurry into the first flexible mold, and hardening or sintering the first slurry to form the first core insert; and creating a composite core comprising the steps of: forming a first layer of a second core insert out of a second material, forming a second layer of the second core insert out of the second material, bonding the first and second layers of the second core insert together to form a second laminate master pattern, forming a second flexible mold around the second laminate master patterns, removing the second laminate master pattern from the second flexible mold, inserting the first core insert into the second flexible mold, pouring a second slurry into the second flexible mold around the first core insert, and sintering the second slurry to form the composite core with the first core insert.

A method of making an airfoil includes making a composite core that defines an interior of the airfoil by a TOMO-lithographic process, the composite core comprising a refractory metal element and a ceramic element, making a mold that defines an exterior of the airfoil, inserting the composite core into the mold, and pouring an airfoil material between the composite core and the mold to cast the airfoil.

DETAILED DESCRIPTION

Figure 5A:
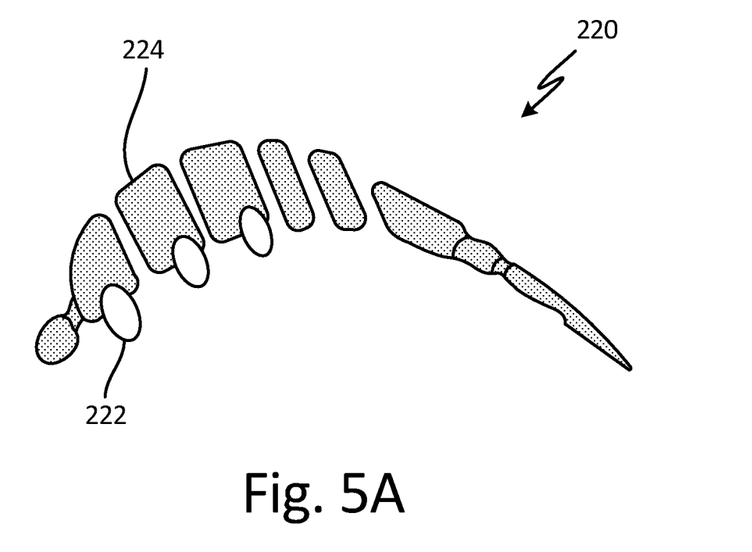
FIGS. 5A-B show a cross sectional elevation view of composite refractory metal and ceramic core, and an elevation view of a composite refractory metal and ceramic core.
Figure 5B:
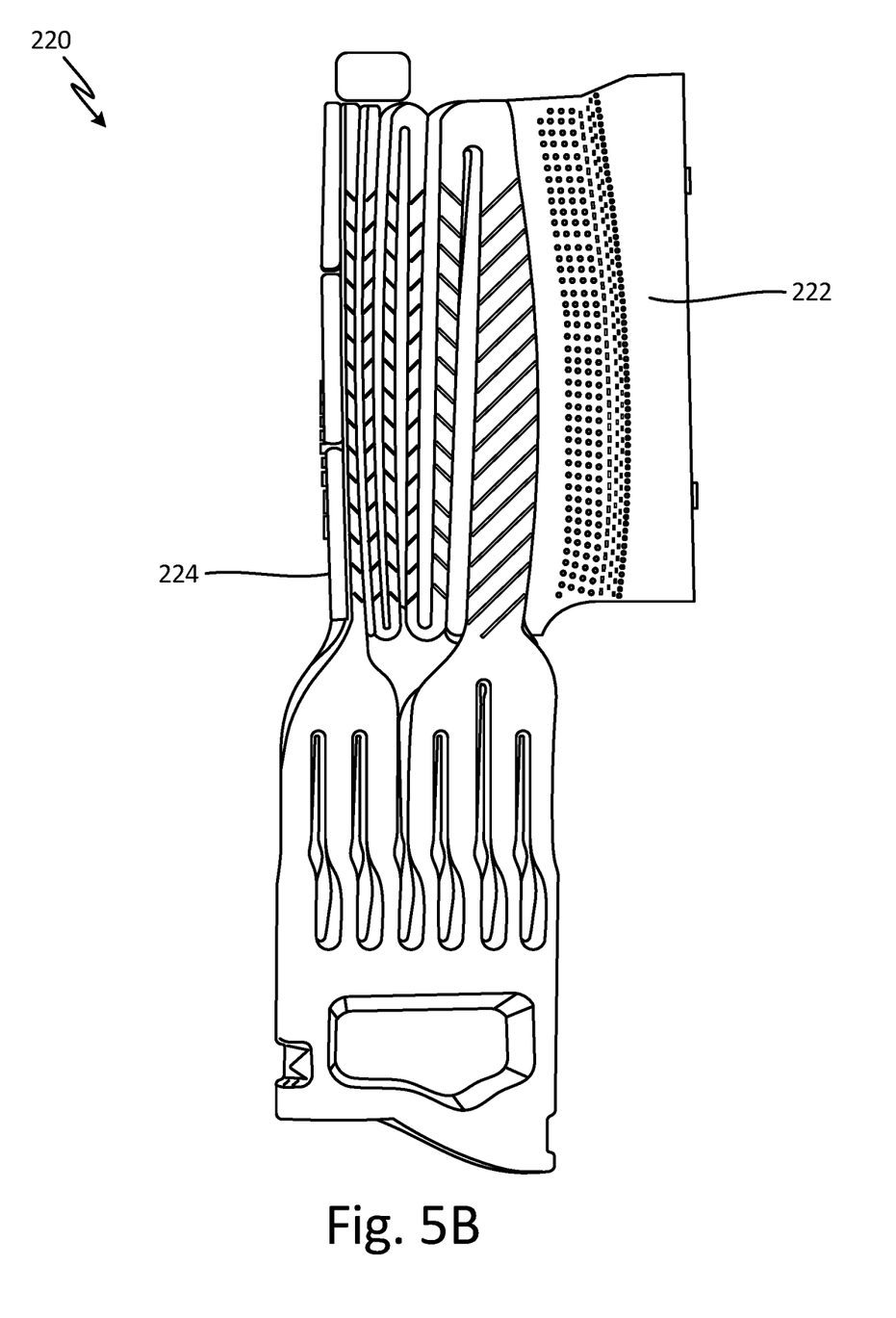

As previously noted, conventional ceramic cores are currently a limiting factor in the design of advanced complex superalloy articles because they impose dimensional limitations on casting design. FIG. 5A shows a cross sectional elevation as in FIG. 4, although FIG. 5A depicts alternate embodiment core 220 which is a composite core comprised of both a refractory metal material and a ceramic material. Composite core 220 is also shown in FIG. 5B from a side elevation perspective. Core 220 includes refractory metal core 222 and ceramic core 224. The combination of a refractory metal core with a ceramic core in the form of a composite core allows for reinforcement of fragile sections of the core body and creation of complex features that would not have process robustness if made from ceramic alone.

Ceramics can include silica, alumina, zirconia, chromia, mullite, and hafnia, or other suitable materials. Refractory metals include, for example, molybdenum, tantalum, niobium, tungsten, and alloys thereof. In general, refractory metals are stronger and more durable than ceramic materials, so refractory metals are better able to survive the casting process. In addition, refractory metals possess higher melting points than the base alloy to be cast and can be formed by a variety of methods into standard shapes.

Refractory metals are generally prone to oxidize at elevated temperatures and are also somewhat soluble in molten superalloys. Accordingly, refractory metal cores can be given a protective coating to prevent oxidation and erosion by molten metal. Refractory metal core elements can be coated with one or more thin continuous adherent ceramic layers for protection. Suitable ceramics include silicon nitride, silicon carbide, silicon boron nitride, silica, alumina, zirconia, chromia, mullite, and hafnia. Preferably, the coefficient of thermal expansion of the refractory metal and the ceramic are similar. Ceramic layers may be applied, for example, by chemical vapor deposition, physical vapor deposition, electrophoresis, and sol gel techniques. Multiple layers of different ceramics can also be employed, and individual layers can typically be 0.0025 mm to 0.025 mm (0.1 in. to 1 in.) thick. In addition, metallic layers of platinum, other noble metals, chromium and aluminum may be applied to the refractory metal elements for oxidation protection, in combination with a ceramic coating for protection from molten metal erosion.

Refractory metal alloys and intermetallics such as molybdenum alloys, tungsten alloys, tantalum alloys, niobium alloys, and molybdenum disilicide ($MoSi_2$), respectively, which form protective silicon dioxide ($SiO_2$) layers can also be employed. Such materials are expected to allow good adherence of a non-reactive oxides such as alumina. It is understood that silica though an oxide is very reactive in the presence of nickel based alloys and must be coated with a thin layer of other non-reactive oxide. However, by the same token silica readily diffusion bonds with other oxides such as alumina forming mullite.

For the present purposes, metals containing solid solution strengtheners, precipitation strengtheners and dispersion strengtheners are classed as alloys. Alloys of molybdenum, for example, include TZM (0.5% titanium, 0.08% zirconium, 0.04% carbon, with the balance being molybdenum), and lanthanated molybdenum alloys of tungsten include, for example, tungsten-rhenium (62% W and 38% Re).

After the refractory metal core piece is completed, it can be inserted into the flexible mold and a refractory metal or ceramic slurry can be flowed around key locking features in the refractory metal layers. This allows for formation of a composite component to lock a ceramic component to the refractory metal core.

After the casting process is complete the shell and core are removed. The shell is external and can be removed by mechanical means to break the ceramic away from the casting, followed as necessary by chemical means usually involving immersion in a caustic solution (possibly under conditions of elevated temperatures and pressures in an autoclave). The refractory metal core can be removed from superalloy castings by acid treatments. For example, molybdenum cores can be removed from a nickel superalloy using 40 parts nitric acid ($HNO_3$), 30 parts sulfuric acid ($H_2SO_4$), with the balance being water ($H_2O$) at temperatures of 60° C. to 100° C. In addition for refractory metal cores of relatively large cross sectional dimensions, thermal oxidation can be used to remove molybdenum which forms a volatile oxide.

Figure 6:
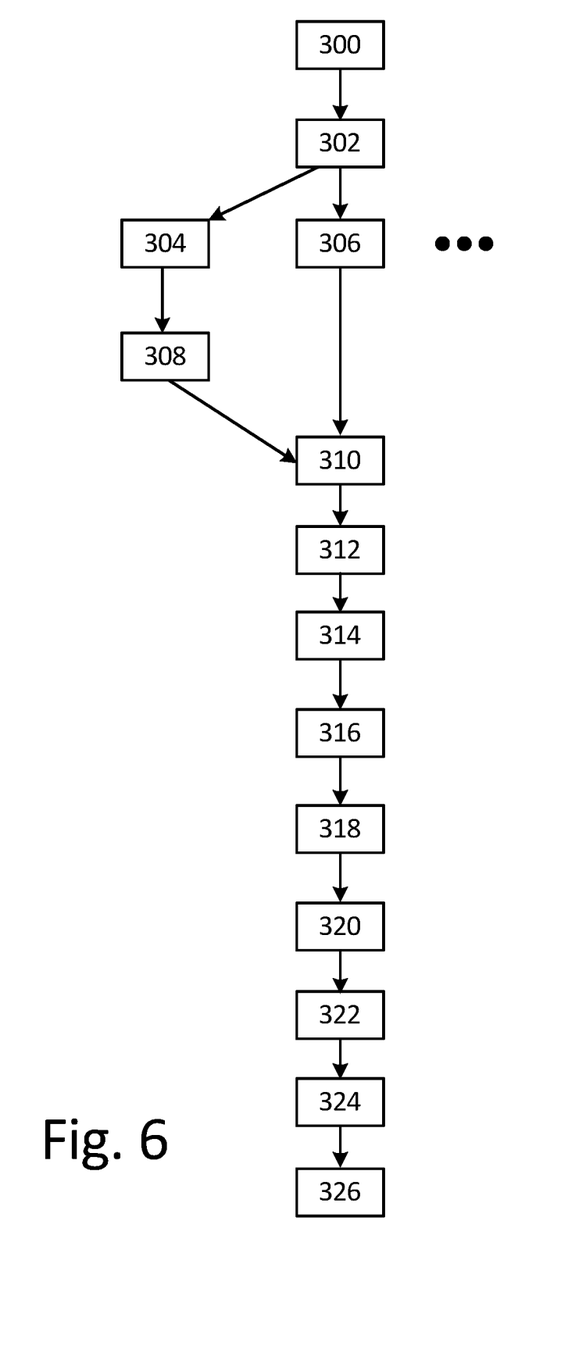
FIGS. 6 and 7 are flowcharts of methods for making the refractory metal core and the ceramic core of FIGS. 5A-B, respectively, using a TOMO-lithographic process.

FIG. 6 is a flowchart of a method for making a first core 222 using a TOMO-lithographic process. Alternatively, other machining or core manufacturing processes can be used in place of TOMO-lithographic processes, such as additive manufacturing. The discussion in reference to FIGS. 6-7 will focus on a TOMO-lithographic method. First core 222 will be used as an insert to create composite core 220. At step 300, a computer model is generated of first core 222, which can be accomplished by analyzing the empty spaces within airfoil 20 either physically or by using a computer model of airfoil 20. At step 302, the computer model is digitally sliced into discrete digital layers. The thickness of each layer can be, for example, about 0.08 mm (0.003 in.), although the layers can have the same or different thicknesses depending on, for example, the desired surface finish and/or the size of the features of first core 222.

At step 304, a first metal foil is formed to correspond to the first layer of the computer model. The metal foil can be made of, for example, a copper material or any material that can be masked and selectively etched, machined, and/or attacked. The forming can be done using photolithography and/or another precision material removal process such as, for example, photo-etching, controlled depth etching, laser machining, reactive ion etching, electroplating, vapor deposition, bulk micro-machining, surface micro-machining, and/or conventional machining.

At step 306, a second metal foil is formed to correspond to the second layer of the computer model. Step 306 can be performed contemporaneously with step 304. As indicated by the ellipsis in FIG. 6, as many metal foil layers can be made as is necessary to physically represent all of the digital layers of the computer model, although, for the sake of simplicity, only the first two layers will be discussed specifically. At step 308, the first layer is aligned with and placed on a fixture.

At step 310, a film of bonding material that is one or more orders of magnitude thinner than the thickness of the first or second layers is applied to at least one of the first and second layers. This bonding material can be, for example, braze paste or adhesive. At step 312, the second layer is aligned with and placed on the fixture on top of the first layer. At step 314, the second layer is affixed to the first layer. The step of affixation can occur, for example, by compression of the layers, by the application of heat, by the removal of heat, by allowing escape of volatile organic compounds, and/or by allowing the passage of time. The result is a lamination master pattern which is physical copy of the computer model of first core 222.

In an alternative embodiment, the master pattern of the core shape can be created from other additive and/or subtractive technologies directly from a computer model or directly machined from another metallic or ceramic material.

At step 316, the lamination master pattern is encased in a suitable flexible molding material such as a root temperature vulcanizing (RTV) silicone rubber. Once the flexible molding material cures, possibly in a vacuum chamber, this new flexible mold is removed from the lamination master pattern at step 318 in at least two pieces.

At step 320, the flexible mold is reassembled. Then, a slurry of a slurry of refractory metal is applied to the flexible mold. For instance, a mixture of refractory metal pulverulent and a binder is mixed to achieve a specific consistency and fluidity and then poured or injected into the flexible mold at step 322. The binder can be organic or inorganic in nature or a mixture of both for example, metal, crosslinkable polymers such as epoxy, silicone (e.g., polysiloxane, in particular polydimethylsiloxane), polyimides, epoxysilanes, phenolics, polyurethanes, polysilsesquioxanes, paraffin filled or nonfilled with plastic constituent, urethane, epoxy, and colloidal silica, ceramic, organic matrix composites, and other hybrid materials. The flexible mold can be backed with metal that is contoured to the shape of the flexible mold to provide additional rigidity which can help during the mold filling process. Either a second refractory metal or ceramic material can be used later, in step 420, shown in FIG. 7 and discussed below. Thus, a final composite core can be created with both refractory metal and ceramic components.

After the binder is sufficiently activated to harden first core 222, the flexible mold is removed from the refractory core at step 324. First core 222 is still in the green state at step 324. At step 326, the refractory metal (or ceramic) is sintered to consolidate and harden the core, forming core 222. Core 222 will be used as an insert during the process described in reference to FIG. 7 to create composite core 220.

Also at or before step 326, the binder can be removed using chemical, thermal, and/or mechanical methods to dissolve, degrade, divide, melt, burn, and/or otherwise destroy the binder. Such methods can include the application of acids, bases, radiation, heat, and/or cold to the refractory core. The sintering is performed in an environment that is sufficiently devoid of oxygen, for example, in an inert or vacuum environment, to prevent oxidation or atmospheric attack of the refractory metal. This sintering can be performed with the refractory core supported by loose inert powder or by encasing the individual cores into inert "setters" to ensure dimensional conformance of core 220.

Figure 7:
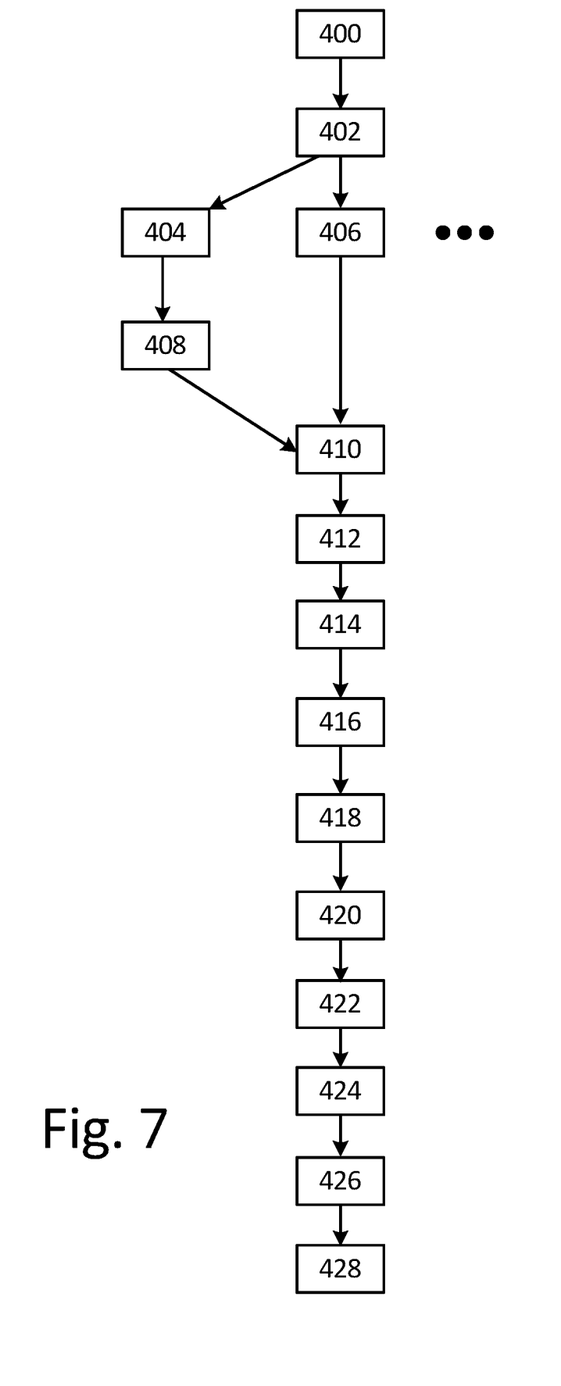

FIG. 7 is a flowchart of a method for making a second core 224 using a TOMO-lithographic process. Second core 224 will be integrated with the first core 222 made through the process described in reference to FIG. 6 to create final composite core 220. The process in FIG. 7 contains steps 400-418, which are similar to steps 300-318 of FIG. 6. At steps 400 and 402, a computer model of second core 224 is generated and sliced into layers. In steps 404 to 414, layers of second core 224 are aligned and attached as described above, creating a master pattern based on second core 224. This master pattern, when combined with the first insert created in FIG. 6, will result in the final shape of the airfoil.

At step 416, the master pattern of second core 224 is encased in molding material as described above. In step 418, the flexible mold material is removed from the master pattern in two pieces. Then, in step 420, the mold is reassembled with both first core 222 from the process of FIG. 6 and second core 224 from FIG. 7.

Steps 422 to 426 are very similar to steps 322 to 426 as described above. However, in step 422, either a metallic or a ceramic slurry (with a binder) is added to the mold. In this fashion, a composite core can be fabricated where ceramic is used to make more robust features of the composite core, while refractory metals are used to make finer features of the composite core. Thus, ceramic to metallic structures are fabricated. In steps 424, the flexible mold is removed from composite core 220. At this point, composite core 220 is still green. Optionally, binders are removed from core 220.

At step 426, composite core 220 is finally sintered as described in reference to step 326. At step 428, metallic parts of core 220 is coated with a ceramic material. Alternatively, the whole composite core 222 can be coated.

At this point, composite core 220 is ready to be inserted into a mold of the exterior surfaces of airfoil 20 so that superalloy material can be poured between the exterior mold and composite core 224 to form airfoil 20. Several refractory metal cores can be combined to form intricate single or multiple wall castings. Composite cores can also be used to make single or double wall components. Because of the inherent precision of the two-dimensional layer creation process that is used to create each layer of the lamination master pattern, core 220 has tighter tolerances than if core 224 were machined from a single piece of material.

In addition, because core 220 is made from refractory metal material(s) and ceramic materials both, core 220 is stronger than ceramic core 120 and is more likely to survive the casting process to produce a correct airfoil 20. Refractory metal portions of composite core 220 strengthen and reinforce fragile sections of core 220 during the casting process and enable the fabrication of complex features not creatable through ceramics alone. Use of refractory metal in conjunction with ceramic also keeps production costs low.

Discussion of Possible Embodiments

The following are non-exclusive descriptions of possible embodiments of the present invention.

A method of making a composite core includes creating a first core insert comprising the steps of: creating a first laminate master pattern, forming a first flexible mold around the first laminate master pattern, removing the first laminate master pattern from the first flexible mold, pouring a refractory metal slurry into the first flexible mold, and sintering the refractory metal slurry to form the first core insert; and creating a composite core comprising the steps of: creating a second laminate master pattern, forming a second flexible mold around the second laminate master patterns, removing the second laminate master pattern from the second flexible mold, inserting the first core insert into the second flexible mold, pouring a second slurry into the second flexible mold around the first core insert, and sintering the second slurry to form the composite core with the first core insert.

The method of the preceding paragraph can optionally include, additionally and/or alternatively, any one or more of the following features, configurations and/or additional components:

Creating a first laminate master pattern includes forming a first layer of the first core insert out of a first material, forming a second layer of the first core insert out of the first material, and bonding the first and second layers of the first core insert together to form the first laminate master pattern.

Creating a second laminate master pattern includes forming a first layer of a second core insert out of a second material, forming a second layer of the second core insert out of the second material, and bonding the first and second layers of the second core insert together to form a second laminate master pattern.

The first slurry comprises a pulverulent refractory metal material.

The pulverulent refractory metal material comprises one of the following materials: molybdenum, tantalum, niobium, and tungsten.

The second slurry comprises a ceramic.

The ceramic comprises one of the following materials: silica, alumina, zirconia, chromia, mullite, and hafnia.

The method includes coating the composite core with a ceramic coating.

The method includes generating a computer model of the refractory metal core and slicing the computer model into a plurality of digital layers.

The first and second layers are formed to match two of the plurality of digital layers.

The method includes analyzing a plurality of empty spaces in an airfoil to generate the computer model of the refractory metal core.

A method of making an airfoil includes making a composite core that defines an interior of the airfoil, the composite core comprising a refractory metal element and a ceramic element, making a mold that defines an exterior of the airfoil, inserting the composite core into the mold, and pouring an airfoil material between the composite core and the mold to cast the airfoil.

The method of the preceding paragraph can optionally include, additionally and/or alternatively, any one or more of the following features, configurations and/or additional components:

The method includes removing the mold from the airfoil, and removing the core from the airfoil.

Removing the core from the airfoil comprises applying an acid treatment.

The method includes applying a ceramic coating to the refractory metal element prior to pouring the airfoil material.

The refractory metal element comprises one of the following materials: molybdenum, tantalum, niobium, and tungsten.

Making a composite core that defines an interior of the airfoil is done by a TOMO-lithographic process.

The TOMO-lithographic process includes forming a first layer of the refractory metal core out of a first material, forming a second layer of the refractory metal core out of the first material, bonding the first and second layers together to form a laminate master pattern, forming a flexible mold around the laminate master pattern, removing the laminate master pattern from the flexible mold, pouring a slurry material mixed with a binder into the flexible mold, and sintering the slurry material in an oxygen-free environment to form the composite core.

The method includes coating the refractory metal element with a ceramic coating.

The method includes generating a computer model of the composite core, slicing the computer model into a plurality of digital layers, and analyzing a plurality of empty spaces in an airfoil to generate the computer model of the composite core.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of making a composite core comprises:
   creating a first core insert comprising the steps of:
      creating a first laminate master pattern;
      forming a first flexible mold around the first laminate master pattern;
      removing the first laminate master pattern from the first flexible mold;
      pouring a refractory metal slurry into the first flexible mold; and
      sintering the refractory metal slurry to form the first core insert; and
   creating a composite core comprising the steps of:
      creating a second laminate master pattern;
      forming a second flexible mold around the second laminate master pattern;
      removing the second laminate master pattern from the second flexible mold;
      inserting the first core insert into the second flexible mold;
      pouring a second slurry into the second flexible mold around the first core insert; and
      sintering the second slurry to form the composite core with the first core insert.

2. The method of claim 1, wherein creating a first laminate master pattern comprises:
   forming a first layer of the first core insert out of a first material;
   forming a second layer of the first core insert out of the first material; and
   bonding the first and second layers of the first core insert together to form the first laminate master pattern.

3. The method of claim 1, wherein creating a second laminate master pattern comprises:
   forming a first layer of a second core insert out of a second material;
   forming a second layer of the second core insert out of the second material; and
   bonding the first and second layers of the second core insert together to form a second laminate master pattern.

4. The method of claim 1, wherein the first slurry comprises a pulverulent refractory metal material.

5. The method of claim 4, wherein the pulverulent refractory metal material comprises one of the following materials: molybdenum, tantalum, niobium, and tungsten.

6. The method of claim 1, wherein the second slurry comprises a ceramic.

7. The method of claim 6, wherein the ceramic comprises one of the following materials: silica, alumina, zirconia, chromia, mullite, and hafnia.

8. The method of claim 1, further comprising:
   coating the composite core with a ceramic coating.

9. The method of claim 1, further comprising:
   generating a computer model of the refractory metal core; and
   slicing the computer model into a plurality of digital layers.

10. The method of claim 2, wherein the first and second layers are formed to match two of the plurality of digital layers.

11. The method of claim 2, further comprising:
    analyzing a plurality of empty spaces in an airfoil to generate the computer model of the refractory metal core.

* * * * *